United States Patent [11] 3,600,043

[72] Inventor John T. Kasselmann, Southfield, Mich.
[21] Appl. No. 839,467
[22] Filed July 7, 1969
[45] Patented Aug. 17, 1971
[73] Assignee The Bendix Corporation

[54] ANTISKID BRAKE SYSTEM UTILIZING A PAIR OF VORTEX VALVES
17 Claims, 5 Drawing Figs.

[52] U.S. Cl. .................................................. 303/21 F, 188/181 A, 303/13, 303/68
[51] Int. Cl. ................................................... B60t 8/12, B60t 13/36
[50] Field of Search .......................................... 303/21, 24, 61—63, 68—69, 10, 6, 40, 13; 188/181

[56] References Cited
UNITED STATES PATENTS
3,494,670  2/1970  Leiber .......................... 303/21
3,495,881  2/1970  Harned et al. ................ 188/181 X
3,369,845  2/1968  Leonard ....................... 303/21

Primary Examiner—Milton Buchler
Assistant Examiner—John J. McLaughlin
Attorneys—William L. Anthony, Jr. and Plante, Hartz, Smith & Thompson ABSTRACT: An antiskid brake system particularly suited for use with existing pneumatic brake systems having a wheel decelerometer to detect above normal wheel deceleration rates in combination with a pair of vortex valves, a first vortex valve for restricting the flow of air to the brake and a second vortex valve for relieving air pressure at the brake when above normal wheel decelerations occur.

PATENTED AUG 17 1971

INVENTOR.
John T. Kasselmann
BY
William L. Anthony, Jr.
ATTORNEY

ANTISKID BRAKE SYSTEM UTILIZING A PAIR OF VORTEX VALVES

BACKGROUND OF THE INVENTION

1. Field of the Invention

Brake systems for vehicles, and more particularly, antiskid brake systems for vehicles.

2. Description of the Prior Art

It is known in the art to sense above normal deceleration rates of a vehicle wheel, and in response thereto, to close a first valve to restrict the flow of brake fluid to the wheel brake and to open a second valve to relieve the fluid pressure at the wheel brake. In prior art systems, the above-described valves are of the mechanical variety. Mechanical valving is, of course, subject to wear and is relatively expensive, unreliable, and space consuming.

SUMMARY OF THE INVENTION

The present invention provides an antiskid brake system using a novel fluidic system which is particularly useful for incorporation in a pneumatic (air) brake system as typically found on large trucks. In the antiskid brake system of this invention, a pair of vortex valves are utilized which are responsive to above normal wheel decelerations and are operatively associated with the brake actuator. A main vortex valve is utilized for restricting the flow of fluid to the actuator and a relief vortex valve is utilized for relieving pressure at the actuator. Accordingly, the net result of the two vortex valves is to reduce the effectiveness of the fluid braking signals transmitted to the brake actuator when skidding is encountered. As a particular advantage of this system over fluidic systems in general, the vent flow from the system is relatively small and within tolerable limits of the brake fluid reserves of existing pneumatic brake systems.

Typically, fluidic circuits and devices inherently vent a significant portion of the total fluid flow necessary to operate the circuit or device. This vent flow would tend to deplete the reserves of brake fluid, and therefore, could only be used in specially designed brake systems having larger reserve capacities. Specially designed systems as above described would add to the cost of an antiskid brake system, and thus, reduce the acceptability of fluidic circuits in antiskid brake systems.

As an additional advantage, the vortex valves of this invention are small, lightweight, inexpensive to produce and reliable. Hence, they are suitable for use with mass produce vehicles having extended maintenance intervals.

The present invention also provides a novel decelerometer which generates a first fluid output signal in response to above normal wheel deceleration rates which is supplied to the main vortex valve to cut off supply of fluid to the brake, and a second fluid output signal during normal decelerations of the vehicle wheel which is supplied to the relief vortex valve to prevent flow therethrough. The decelerometer is provided with a dampening system which permits rapid pressure reduction at the brake actuator but only slow pressure rise to allow the wheel to accelerate to nonskidding engagement with the road after skidding is sensed.

In view of the above, the advantageous relationship of the decelerometer and the vortex valves of this invention will be apparent. Particularly, two vortex valves are normally operated by only a single control signal, quite small in relation to the total flow controlled by the vortex valves, thereby further minimizing the internal flow, and accordingly, the vent flow necessary for the operation of the system.

Although this system is primarily intended for use with pneumatic brake systems, it may also be used suitably with a hydraulic brake system by incorporating therewith a recovery and return system for vented brake fluid. Since this invention provides an antiskid brake system having nominal internal and vent flows, the capacity requirements for a recovery and return system are minimized.

DETAILED DESCRIPTION OF THE PREFERRED EMBODIMENT

Figure 1:
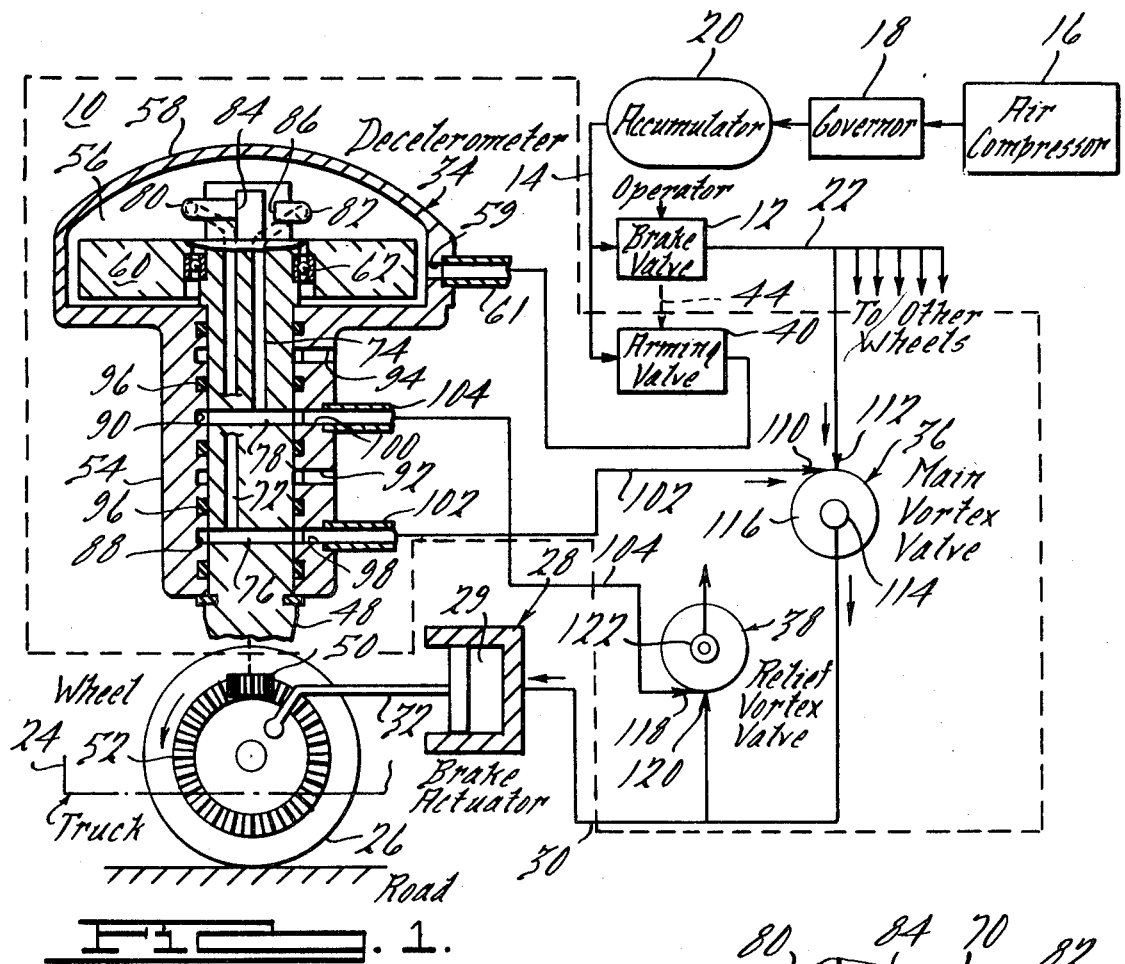
FIG. 1 is a schematic illustration of the antiskid brake system of this invention.
Figure 2:
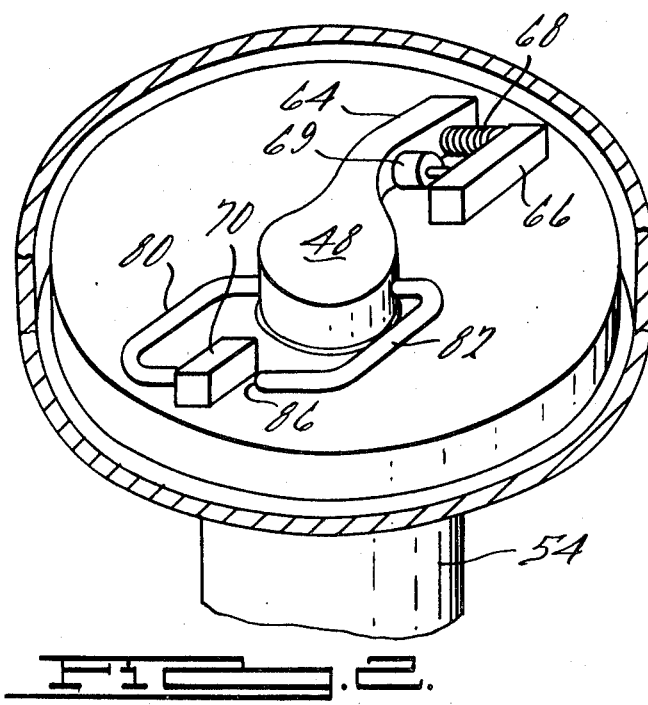
FIG. 2 is a partial perspective view of a portion of a decelerometer utilized in the system of FIG. 1.

In FIG. 1, a pneumatic brake system for a truck is shown which includes an antiskid brake system 10 according to this invention. The brake system of FIG. 1 includes an operator input or brake valve 12 for modulating a flow of brake fluid on a supply line 14 in accordance with the operator braking commands to provide fluid braking signals. Brake fluid on supply line 14 (for example, air) is derived from an air compressor 16, a governor 18 and an accumulator 20, all of conventional construction. The supply of brake fluid, which has been modulated according to the operator braking commands by brake valve 12, is delivered through brake valve outlet line 22 to the wheels of the truck 24 or other vehicle. By way of illustration, a single wheel 26 for engaging a road (i.e. surface of travel) is shown having a brake actuator 28 including a brake actuator chamber 29 which normally receives an apportioned share of the modulated braking fluid from the brake valve outlet line 22 through a brake actuator main line 30. The brake actuator 28 is provided with a brake actuator output member 32 which is operably connected to a pair of brake shoes (not shown) for urging engagement with a brake drum (also not shown). It will be appreciated that the brake system described above is conventional.

The antiskid brake system 10 of this invention includes a decelerometer 34 for sensing incipient skidding between the wheel 26 and the road, a main vortex valve 36 connected between the brake valve output line 22 and the brake actuator main line 30 for restricting the flow of braking fluids to the brake actuator 28 when a skidding condition is sensed by the decelerometer 34, and a relief vortex valve 38 connected to brake actuator main line 30 between the brake actuator 28 and the main vortex valve 36 for relieving pressure at the brake actuator 28 by flowing fluid therefrom when the skidding condition is sensed. To prevent loss of brake fluid through residual venting of the vortex valve 36 when the brake system is inactive, an arming valve 40 is provided which is activated by a suitable mechanical linkage 44 when the brake valve 12 is activated by the operator. The arming valve 40 also receives brake fluid from the accumulator 20 via flow line 14. The arming valve 40 is preferably an "on-off" valve rather than a flow proportioning valve.

The decelerometer 34 includes a main shaft 48 which is operably connected to the vehicle wheel 26 for proportional rotation therewith, for example, by a pinion gear 50 mounted on the shaft 48 which engages a face gear 52 mounted on the wheel 26. The main shaft 48 is journaled within the housing 54 such that its upper end extends into a chamber 56 formed by a domed cover 58 on the housing 54. The cover 58 is provided with an inlet flow passage 59 communicating chamber 56 with a supply flow line 61. The supply flow line 61 is connected at its other end to the output of the arming valve 40 for receiving flow therefrom.

A flywheel or inertia member 60 is mounted within the chamber 56 coaxially on the upper end of the main shaft 48 by a suitable bearing 62 such that the mounting has low frictional resistance to relative rotation between the flywheel 60 and the main shaft 48. The main shaft 48 is provided with an extension 64 which extends across the upper surface of the flywheel 60 and is positioned above it such that there is no contact therebetween. The flywheel 60 is provided with a first vertical projection 66 for mounting of one end of a coiled spring member 68. The other end of the coiled spring member 68 is affixed to the extension 64 of the main shaft 48 such that there is a resilient connection between the main shaft 48 and the flywheel 60 allowing limited relative rotation therebetween in proportion to the torque exerted by one on the other. A one-way dampening device 69 also connects the extension 64 of the main shaft 48 with the projection 66 of the flywheel 60. The dampening device 69 is constructed to permit rapid contraction without substantial resistance, but will resist rapid extension. For example, a device of this nature may be a piston and cylinder arrangement having poppet valve on the piston which allows rapid flow by the piston in one direction only, or a piston cylinder arrangement with a vortex valve carried by the piston as taught by the Mayer U.S. Pat. No. 3,362,508, assigned to the assignee of this invention. The flywheel 60 is also provided with a second vertical projection 70, the purpose of which will be explained below.

Figure 3B:
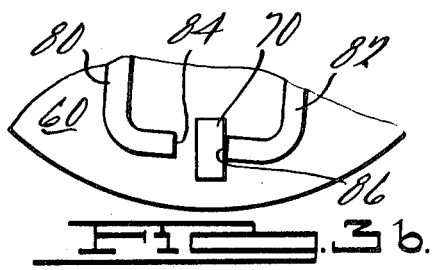
FIGS. 3a and 3b comprise two partial views of a portion of the decelerometer illustrating two modes of operation of the decelerometer of FIG. 1.

The main shaft 48 is provided with a pair of longitudinal flow passages 72 and 74 which connect at one end with transverse passages 76 and 78, respectively, and at the other end with rigid conduits 80 and 82, respectively. The conduits 80 and 82 terminate in nozzles 84 and 86, respectively. The conduits 80 and 82 are arranged such that nozzle 84 is resiliently urged into contact with one face of projection 70 to form a fluid seal therewith as shown in FIG. 1. When nozzle 84 is in contact with projection 70, the spring 68 is compressed a predetermined small amount which sets the threshold of operation of decelerometer 34. The nozzle 86 is spaced apart from the projection 70 also as shown in FIG. 1, and accordingly, permits fluid flow from chamber 56 through conduit 82. The spacing of nozzles 84 and 86, and the width of projection 70, are selected such that, at a predetermined torque exerted by the main shaft 48 on the flywheel 60, the nozzle 86 comes into sealing engagement with the face of projection 70 nearest to it as shown in FIG. 3b. Between the extreme positions, there is progressive movement in accordance with the torque exerted by the main shaft 48 on the flywheel 60. Therefore, it will be appreciated that the nozzles 84 and 86, in combination with the projection 70, provide a pair of proportioning valves which operate inversely with respect to each other in response to relative rotation between the flywheel 60 and the main shaft 48.

The housing 54 is provided with a pair of internal annular grooves 88 and 90 which are located at transverse passageways 76 and 78, respectively, for communication therewith. Annular passages 88 and 90 are isolated from each other and from vent passages 92 and 94 by a plurality of annular seals 96. It will be appreciated that annular grooves 88 and 90, in combination with transverse passageways 76 and 78, provide a fluid commutator which transmits pressures from longitudinal passageways 72 and 74 to the annular grooves 88 and 90, respectively. The housing 54 is further provided with output fluid passages 98 and 100 which communicate the pressure in annular grooves 88 and 90, respectively, to the main valve line 102 and to the relief valve line 104, respectively.

The main vortex valve 36 is provided with a control port 110 which is connected to the main valve line 102 from the decelerometer 34, a supply port 112 connected to the output line 22 of brake valve 12, and an outlet port 114 connected to the brake actuator 28 by main line 30. The main vortex valve may have a configuration shown in the Mayer U.S. Pat. No. 3,424,182, assigned to the assignee of this invention. However, those skilled in this art will appreciate that many other vortex valves are available which operate essentially as described herein.

With regard to the operation of the vortex valve 36, it will be appreciated that flow from the supply port 112 to the outlet 114 is inversely dependent on flow through the control port 110. To more fully understand this relationship, the effects of the flow in the vortex chamber 116 of the main vortex valve 36 will be briefly considered. Particularly, when the control flow at the control port 110 is zero, the supply flow from the supply port 112 passes radially to the outlet 114 without substantial restriction. However, when there is a control flow at the control port 110, a rotational velocity is imparted to the supply flow entering the supply flow port 112 causing it to swirl or to form a vortex flow pattern in the vortex chamber 116 before it egresses the outlet 114. The swirl builds up a higher pressure at the outer periphery of the vortex chamber 116 than at the radially inward portion due to the centrifugal effects of the rotating flow. This pressure buildup at the outer periphery impedes flow since the supply flow pressure drop into the vortex chamber 116 is reduced. At a predetermined control flow rate, the fluid in the vortex chamber 116 reaches a sufficient rotational velocity to create a pressure at the periphery of vortex chamber 116 which is equal to the supply pressure at the supply port 112. When this pressure match occurs, there is no longer a supply flow pressure drop into the vortex chamber 116, and therefore, flow of supply fluid into the chamber ceases. Accordingly, the supply flow at the supply port 112 is fully restricted. Under this condition, the only flow through the main vortex valve 36 is the control flow through the control port 110 which is small in comparison to the flow capability of the main vortex valve 36 from the supply port 112 to the outlet 114.

The relief vortex valve 38 is provided with a control port 118 connected to the relief valve line 104 from the decelerometer 34, a supply port 120 connected to the brake main line 30, and an outlet port 122 which is vented to atmosphere or to a recovery and return system (not shown) in the case of hydraulic fluids. The relief vortex valve 38 also may have a configuration as described in the aforementioned Mayer, U.S. Pat. No. 3,424,182 or may be of other construction which provides essentially the same operation.

OPERATION

Brake fluid is delivered from the air compressor 16 to the accumulator 20 upon demand sensed by the governor 18. The brake fluid in accumulator 20 is made available to both the brake valve 12 and arming valve 40 by the line 14. Application of the brake valve 12 by the vehicle operator causes a flow of the brake fluid from the accumulator 20 to the main vortex valve 36 which is modulated in accordance with the operator braking commands. Since the main vortex valve 36 is normally open, as will be explained below, brake fluid is delivered therefrom to both the brake actuator 28 and the relief vortex valve 38 which, as also will be explained below, is normally closed. Accordingly, the pressure of the brake fluid from the brake valve 12 is delivered, undiminished by either a restriction of the main vortex valve 36 or an opening of the relief vortex valve 38, to the brake actuator 28.

By virtue of the mechanical linkage 44, the activation of the brake valve 12 opens the arming valve 40 thereby transmitting brake fluid from the accumulator 20 to the decelerometer chamber 56 through the line 61 and the decelerometer inlet passage 59. It will thus be appreciated that brake fluid under pressures is available in the chamber 56 for flow through nozzle 84, nozzle 86, or both, depending upon the position of the flywheel projection 70 with respect to the nozzles 84 and 86.

To facilitate an understanding of the operation of nozzles 84 and 86, consider the case in which the operator has applied the brakes of the vehicle 24 under such conditions that the wheel 26 remains in rolling, i.e. nonskidding, engagement with the road as the vehicle 24 decelerates. Accordingly, as the vehicle 24 decelerates, the wheel 26 will experience a commensurate angular deceleration rate since it is in nonskidding engagement with the road. Since it is presumed that the wheel is not skidding, it will be appreciated that the vehicle 24 is decelerating at or below its maximum possible decelerating rate. Accordingly, the wheel 26 is decelerating at an angular deceleration rate which is below a commensurate predetermined maximum rate of angular deceleration at which nonskidding road engagement can persist. The deceleration rate of the wheel 26 is transmitted through the main shaft 48 by means of the pinion gear 50 and the face gear 52. The flywheel 60 will decelerate in unison with the main shaft 48 since the prestress of the connecting spring 68 is preselected to be greater than the force necessary to overcome the inertia of the flywheel 60 at or below the predetermined maximum amount of angular deceleration of the wheel 26 which is representative of nonskidding engagement with the road. Accordingly, there will be no relative rotation of the main shaft 48 with respect to the flywheel 60, and therefore, the nozzle 84 will remain in contact with the projection 70 as shown in FIG. 1 to prevent any of the pressurized brake fluid in chamber 56 from entering the conduit 80. Therefore, brake fluid pressure is not transmitted to the control port 110 of the main vortex valve 36, and accordingly, the main vortex valve is "open" thereby providing unrestricted transmission of brake fluid from the brake valve 12 to the brake actuator 28.

On the other hand, the nozzle 86 is spaced apart from the projection 70, and accordingly, pressurized brake fluid from the chamber 56 enters the conduit 82. The pressurized brake fluid entering the conduit 82 is transmitted through the longitudinal flow passage 74 to the transverse passage 78. As previously explained, the pressure in the transverse passage 78 is commutated to the flow line 104 through the angular groove 90. The pressurized brake fluid in the flow line 104 is communicated to the control port 118 of the relief vortex valve 38 to substantially "shut off" the relief vortex valve 38 by establishing a high rotational flow velocity in the vortex chamber of the relief vortex valve 38. Accordingly, the relief vortex valve 38 acts as a closed valve, and therefore, does not relieve the pressure at the brake actuator 28.

In summary, when the brake valve 12 is applied under conditions in which there is no skidding between the wheel 26 and the road, the flywheel 60 decelerates at the same rate as the main shaft 48 thereby maintaining nozzle 84 closed and nozzle 86 open such that the main vortex valve is open and the relief vortex valve is closed. Accordingly, the fluid braking signal from the brake valve 12 is not reduced since the main vortex valve 36 is unrestricted and there is no relief of the brake fluid pressure at the brake actuator 28 by the relief vortex valve 38.

Figure 3A:
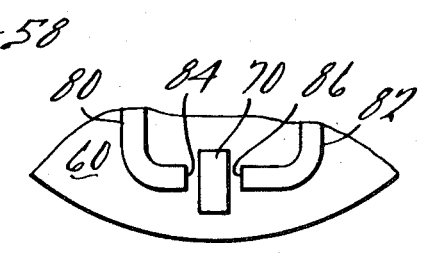

Consider now the case in which the operator activates the brake valve 12 under conditions which cause skidding or sliding between the vehicle wheel 26 and the road. Under these conditions, the wheel 26 will tend to decelerate at a rate which is greater than the predetermined maximum rate representative of nonskidding engagement of the wheel 26 with the road. This rate of deceleration is transmitted to the main shaft 48. As discussed previously, the spring member 68 connecting the main shaft 48 with the flywheel 60 is prestressed such that there is no relative rotation between the main shaft 48 and the flywheel 60 for rates of angular deceleration of the wheel 26 which are below the predetermined maximum nonskidding rate. However, since we have presumed that the wheel 26 is skidding, the deceleration rate of the main shaft 48 will be above the predetermined maximum nonskidding rate. Consequently, the torque exerted on the spring 68 by the flywheel 60 due to its inertia is sufficiently great so as to overcome the prestress of the coil spring 68, and to cause additional compression of the spring 68 thereby moving nozzle 84 from the extension 70 as shown in FIGS. 3a and b. As a result, pressurized brake fluid flows from the chamber 56 through the conduit 80 into the longitudinal passageway 72. The pressurized brake fluid in the longitudinal passageway 72 is commutated to the main valve line 102 through the transverse passageway 76 and the annular groove 88. The pressurized brake fluid in the main valve line 102 is transmitted to the control port 110 of the main vortex valve 36 where it serves to partially restrict the flow of brake fluid from brake valve 12 to the brake actuator 28.

If the projection 70 is located in an intermediate position with respect to nozzles 84 and 86 as shown in FIG. 3a, brake fluid continues to flow through nozzles 86 to the control port 118 of the relief vortex valve 38. However, by virtue of the nearer position of the projection 70 with respect to nozzle 86 as shown in FIG. 3a, the flow rate is diminished. Accordingly, the flow at the control port 118 of the relief vortex valve 38 is less, and consequently, the relief vortex valve 38 is only partially closed. Under the above-described condition, it will be appreciated that the brake fluid pressure downstream of the main vortex valve 36 is reduced by the partial venting through the relief vortex valve 38.

In summary, under moderate skidding conditions, the main vortex valve 36 and the relief vortex valve 38 are both partially restricted causing reduction of the braking signal transmitted from the brake valve 12 to the brake actuator 28. Accordingly, the brake actuator 28 only receives a fraction of the normal brake fluid pressure, determined by the position of projection 70 with respect to nozzles 84 and 86, and therefore, the force exerted by the brake actuator 28 is reduced.

If the skidding is severe, the angular deceleration rate of the wheel 26 will be considerably above the predetermined maximum nonskidding deceleration rate. Accordingly, the flywheel 60 will exert a relatively high inertial force on the spring 68 causing compression of the spring 68 which is sufficient to move the nozzle 86 into sealing engagement with the projection 70 as shown in FIG. 3b. Under this condition, the flow into conduit 80 through nozzle 84 is at a maximum whereas there is no flow into conduit 82 through nozzle 86. Accordingly, the control port 110 of the main vortex valve 36 receives a maximum flow which is sufficient to close the main vortex valve 36 thereby preventing the flow of brake fluid from brake valve 12 to the brake actuator 28. At the same time, no flow is delivered to the control port 118 of the relief vortex valve 36, and accordingly, the relief vortex valve 36 is open to permit venting of the brake fluid in the chamber 29 of the brake actuator 28. It will be appreciated that the main vortex valve 36, when closed, not only restricts braking commands from the brake valve 12, but also prevent any venting of the brake fluid from the other wheels which may not be skidding.

The reduction of the pressure at the brake actuator 28 is quite rapid once a skidding condition is sensed since the one-way dampening device 69 permits rapid movement of the nozzle 84 from the projection 70. As the pressure in the brake actuator chamber 29 is reduced, the force exerted by the brake actuator 28 is correspondingly reduced thereby reducing the deceleration rate of the wheel 26. As deceleration rate of the wheel 26 approaches the maximum nonskidding rate, the spring 68 once again overcomes the inertial effect of the flywheel 60 and will tend to bring the nozzle 84 into sealing engagement with the projection 70. However, although the wheel has then reached the maximum nonskidding deceleration rate, skidding has not ceased as will be apparent with reference to the chart of FIG. 4.

Figure 4:
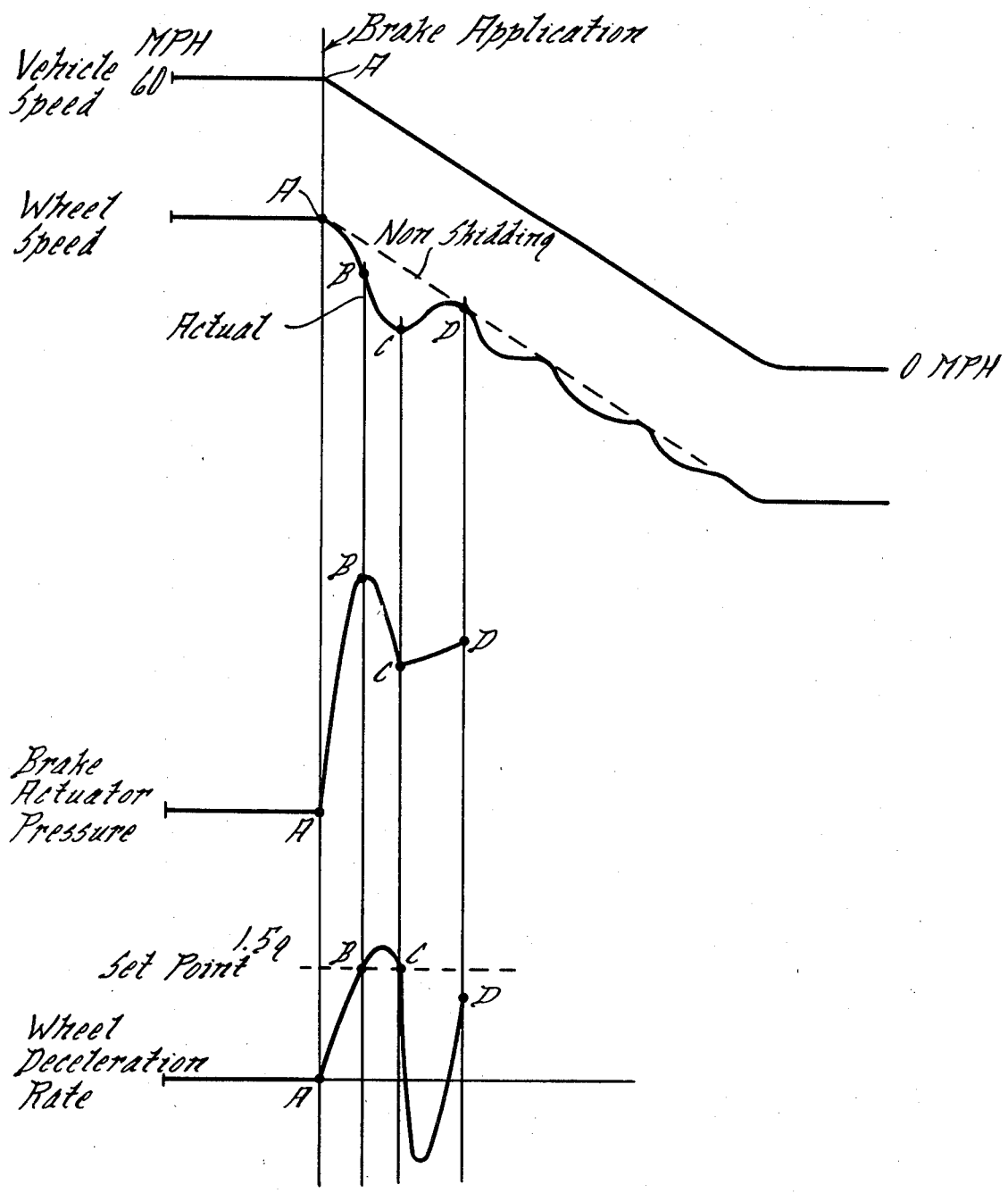
FIG. 4 is a chart illustrating the parameters of operation of the antiskid brake system of FIG. 1.

The chart of FIG. 4 illustrates several braking parameters of a vehicle undergoing deceleration in response to an operator braking command. At point A, the operator has applied the brakes of the vehicle. As can be seen from the chart of FIG. 4, the vehicle speed begins decreasing immediately thereafter, whereas the brake actuator pressure and the wheel deceleration rate begin to increase. At point B the wheel deceleration rate has increased to the predetermined set point of the system, for example, 1.5 g. At this point, the wheel is skidding as evidenced by a decrease in the wheel speed which is disproportionate to the decrease in vehicle speed. The decelerometer 34 senses the set point deceleration rate of the vehicle wheel and reacts to reduce the pressure at the brake actuator 28 as explained previously. Accordingly, the deceleration rate will decrease as shown. At point C, the wheel deceleration rate has been reduced to the set point rate. As a result, the inertia effect of the flywheel 60 is overcome by the spring 68 and the nozzle 84 will move toward sealing engagement with the projection 70. As it so moves, the brake actuator pressure will begin to rise. However, because of the resistance of the dampening device 69, the return of nozzle 84 to sealing engagement with projection 70 is relatively gradual allowing further reduction in the deceleration rate of the wheel. In fact, the amount of one-way resistance of the dampening device 69 is preset such that the brake actuator pressure rise is sufficiently gradual to allow the wheel to accelerate, as indicated as a negative deceleration rate on the chart, to substantially nonskidding engagement with the road at point D. Accordingly, the wheel speed is proportional to the vehicle speed and the wheel deceleration rate is below the nonskidding deceleration rate. If the braking command supplied by the operator remains at a sufficiently high level to again cause the wheel to skid, the process is repeated. As the speed of the vehicle decreases, the fluctuations between the wheel speed and the vehicle speed decrease causing transgressions between substantially nonskidding and slightly skidding engagement with the road which provide the shortest possible stopping distance.

It will now be appreciated that the amount that the spring 68 is compressed when the nozzle 84 is in engagement with projection 70 must be preset so as to establish the predetermined rate of deceleration of the wheel 26 at which separation between the projection 70 and nozzle 84 occurs thereby establishing the inception of antiskid correction. For example, for a given flywheel weight, increasing the initial compression increases the rate of deceleration of wheel 26 which is required before the nozzle 84 will separate from the projection 70 since the spring force urging the nozzle 84 against the projection 70 increases. Also for a given flywheel weight, the spring constant of spring 68 may be adjusted to determine the amount of antiskid correction which is applied for a given change in rate of deceleration of wheel 26, i.e., the rate of reaction of the system. For example, lower spring constants will provide greater reaction to given increases in the rate of deceleration of wheel 26. The spring constant of the spring 68 may be especially optimized to suit the braking characteristics of particular vehicle models. If desired, the weight of the flywheel 60 may be adjusted to determine the deceleration rate at which skidding connection is initiated and to determine the rate of reaction of the system.

It will further be appreciated that the dampening rate of the dampening device 69 must be established so as to "tune" the system to a particular vehicle model. Generally, a dampening ratio of 1 to 5 is appropriate. It will be appreciated by those skilled in the art that wheels with high rotational inertia and wheels with leading brakeshoes will require high dampening ratios.

In view of the preceding explanation of the operation of the pneumatic antiskid brake system 10, the applicability of the present invention to hydraulic brake systems will be apparent. In an equivalent hydraulic brake system, it is preferred to use a recovery system or sump for collecting the liquid vent flow from the outlet port 122 of the relief vortex valve 38. In addition, a return or scavenge system for transporting the collected fluid to the brake fluid reservoir is preferred. It is also desirable to install a second arming valve at the inlet port 120 of the relief vortex valve 38 which is mechanically linked to the brake valve 40 such that the second arming valve is turned off except when the brake valve 12 is activated. The second arming valve serves to prevent the draining of brake fluid from the brake actuator chamber 29 when the brakes are not in use.

With regard to the vent flows of this system, the following will be appreciated. The arming valve 40 prevents any vent flow when the brakes are not applied. When the brakes are applied, whether or not skidding is encountered, the only vent flow egressing system 10 occurs at the outlet 122 of relief vortex valve 38 (thereby permitting a comparatively simple recovery system, if utilized). When skidding is not encountered, the flow into the relief valve 38 from the supply port 120 is blocked by a high rotational velocity caused by control fluid ejected from the tangential control port 118. Accordingly, the only flow into the vortex chamber of the relief vortex valve 38, and consequently, the only flow out of the vortex chamber at outlet 122 is the control flow through control port 118. Moreover, the control flow through control port 118 is small relative to the flow to the brake actuator chamber 29, and therefore, the vent flow from the relief vortex valve 38 is also relatively small. When a skidding condition is encountered, the relief vortex valve 38 is opened to allow the main flow of brake fluid in line 30 and the fluid in the brake actuator 29 to vent through the outlet 122. However, at substantially the same time, the main vortex valve 36 is closed upstream of the relief vortex valve 38 to prevent any loss of the brake fluid in line 30 over that required to relieve the pressure in the brake actuator chamber 29. Accordingly, the only vent flow from the system when skidding is being corrected will be the control flow from control port 110 which is necessary to close the main vortex valve 36. It will thus be appreciated that the system 10 of the present invention minimizes the loss of brake fluid through venting under all conditions of operation.

While I have described a preferred embodiment of the present invention, it should be understood that various changes, adaptions and modifications may be made therein without departing from the spirit of the invention and the scope of the appending claims.

Having thus described my invention, I claim:

1. An antiskid brake system for a vehicle having an input which receives operator commands and provides fluid braking signals representative thereof, and a fluid operated brake for a road-engaging wheel of said vehicle comprising:
    means for sensing skidding between said wheel and said road; and
    means including vortex valve means defining in part a fluid flow path for said fluid braking signals to said fluid operated brake and controlled by said sensing means to communicate said fluid braking signals to said brake when skidding is not sensed and reduce said fluid braking signals communicated to said brake when skidding is sensed.

2. The antiskid brake system of claim 1 wherein said sensing means senses deceleration rates of said wheel above a predetermined rate of deceleration which is related to maximum nonskidding deceleration rate of said wheel.

3. The antiskid brake system of claim 1 wherein said sensing means comprises:
    a first member operatively connected to said wheel for rotation therewith;
    a second member connected to said first member in a manner to provide limited relative rotation between said first and second members in response to a predetermined deceleration rate of said first member which is related to the maximum deceleration rate capability of said wheel without encountering skidding; and
    output means for controlling said vortex valve means such that said fluid braking signals communicated to said brake are reduced when relative rotation between said first and second members occurs.

4. An antiskid brake system for a vehicle having an input which receives operator commands and provides fluid braking signals representative thereof, and a fluid operated brake for a road-engaging wheel of said vehicle comprising:
    means for sensing skidding between said wheel and said road; and
    means operatively associated with said sensing means including a first vortex valve for communicating said fluid brake system signals to said brake when skidding is not sensed and for restricting the flow of said braking signals communicated to said brake when skidding is sensed, and a second vortex valve communicating with said brake for flowing fluid from said brake when skidding is sensed.

5. The antiskid brake system of claim 4 wherein said sensing means senses deceleration rates of said wheel above a predetermined rate of deceleration which is related to maximum nonskidding deceleration rate of said wheel.

6. The antiskid brake system of Claim 4 wherein said sensing means comprises:
    a first member operatively connected to said wheel for rotation therewith;

a second member connected to said first member in a manner to provide limited relative rotation between said first and second members in response to a predetermined deceleration rate of said first member which is related to the maximum deceleration rate capability of said wheel without encountering skidding; and output means for providing a first fluid control signal to said first vortex valve for restricting the flow of fluid braking signals communicated to said brake when relative rotation between said first and second members occurs, and for further providing a second control signal communicated to said second vortex valve for restricting the flow of fluid from said brake when there is no relative rotation between said first and second members.

7. An antiskid brake system for a vehicle having an input which receives operator commands and provides fluid pressure braking signals representative thereof, a brake for a road-engaging wheel of said vehicle, and a fluid operated actuator for the brake:

means for sensing a parameter relating to skidding between said wheel and said road;

a first vortex valve having a control port operatively associated with said sensing means, a supply port connected to said input and an outlet connected to said actuator for restricting the flow of said fluid braking signals to said actuator when skidding is sensed; and a second vortex valve having a control port operatively associated with said sensing means, and a supply port connected to said actuator for flowing fluid from said actuator when skidding is sensed.

8. The antiskid brake system of claim 7 wherein said sensing means senses deceleration rates of said wheel above a predetermined rate of deceleration which is related to maximum nonskidding deceleration rate of said wheel.

9. The antiskid brake system of claim 7 wherein said sensing means comprises:

a first member operatively connected to said wheel for rotation therewith;

a second member connected to said first member in a manner to provide limited relative rotation between said first and second members in response to a predetermined deceleration rate of said first member which is related to the maximum deceleration rate capability of said wheel without encountering skidding; and output means for providing a first fluid control signal to said first vortex valve for restricting the flow of fluid braking signals communicated to said brake actuator when relative rotation between said first and second members occurs, and for further providing a second control signal communicated to said second vortex valve for restricting the flow of fluid from said brake when there is no relative rotation between first and second members.

10. The antiskid brake system of claim 7 wherein said sensing means comprises:

a shaft member operatively connected to said wheel for rotation therewith;

a flywheel;

means connecting said shaft member with said flywheel for providing limited relative rotation therebetween in response to a predetermined deceleration rate of said member which is related to the maximum deceleration rate capability of said wheel without encountering skidding; and output means for providing a first fluid control signal to said first vortex valve control port for restricting the flow of fluid braking signals communicated to said brake actuator when there is relative rotation between said shaft member and said flywheel, and for further providing a second control signal communicated to said second vortex valve control port for restricting the flow of fluid from said brake actuator when there is no relative rotation between said shaft member and said flywheel.

11. The antiskid brake system of claim 10 wherein said connecting means includes a resilient member connecting said flywheel and said shaft member.

12. The antiskid brake system of claim 11 wherein said resilient member is prestressed a predetermined amount when there is no relative rotation between said shaft member and said flywheel which determines said predetermined deceleration rate related to said maximum nonskidding deceleration rate.

13. The antiskid brake system of claim 10 wherein said connecting means includes a one-way dampening means connecting said shaft member and said flywheel for permitting substantially unresisted increases in relative rotation between said flywheel and said shaft member and for resisting reductions in relative rotation therebetween.

14. The antiskid brake system of claim 10 wherein said sensing means further comprises:

a first valve, having an inlet adapted to be connected to a source of supply fluid and an outlet connected to said first vortex valve control port, which is operatively associated with said shaft member and said flywheel in a manner such that it is closed when there is no relative rotation between said shaft member and said flywheel and is progressively opened in response to progressive relative rotation between said shaft member and said flywheel; and a second valve, having an inlet adapted to be connected to a source of supply fluid and an outlet connected to said control port of said second vortex valve, which is operatively associated with said shaft member and said flywheel in a manner such that said second valve is opened when there is no relative rotation between said shaft member and said flywheel and is progressively closed in response to progressive relative rotation between said shaft member and said flywheel.

15. The antiskid brake system of claim 14 wherein said connecting means includes a resilient member connecting said flywheel and said shaft member.

16. The antiskid brake system of claim 15 wherein said resilient member is prestressed a predetermined amount when there is no relative rotation between said shaft member and said flywheel which determines said predetermined deceleration rate related to said maximum nonskidding deceleration rate.

17. The antiskid brake system of claim 16 wherein said connecting means includes a one-way dampening means connecting said shaft member and said flywheel for permitting substantially unresisted increases in relative rotation between said flywheel and said shaft member and for resting reductions in relative rotation therebetween.